(12) United States Patent
Zhou

(10) Patent No.: US 11,243,606 B2
(45) Date of Patent: Feb. 8, 2022

(54) METHOD AND APPARATUS FOR CONTROLLING DEFORMATION OF FLEXIBLE VIRTUAL REALITY INTERACTION CONTROLLER, AND VIRTUAL REALITY INTERACTION SYSTEM

(71) Applicant: Beijing Zhigu Rui Tuo Tech Co., Ltd., Beijing (CN)

(72) Inventor: Liang Zhou, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 381 days.

(21) Appl. No.: 15/378,354

(22) Filed: Dec. 14, 2016

(65) Prior Publication Data

US 2017/0185143 A1 Jun. 29, 2017

(30) Foreign Application Priority Data

Dec. 24, 2015 (CN) .......................... 201510992145.9

(51) Int. Cl.
*G06F 3/0346* (2013.01)
*G06F 3/01* (2006.01)
(Continued)

(52) U.S. Cl.
CPC .............. *G06F 3/011* (2013.01); *G06F 3/005* (2013.01); *G06F 3/017* (2013.01); *G06F 3/0304* (2013.01); *G06F 3/0346* (2013.01)

(58) Field of Classification Search
CPC ........ G06F 3/011; G06F 3/0346; G06F 3/005; G06F 3/0304; G06F 3/017; G06F 2203/012
See application file for complete search history.

(56) References Cited

U.S. PATENT DOCUMENTS

| 7,084,884 B1 * | 8/2006 | Nelson ................... G06F 3/014 345/156 |
| 2002/0021277 A1 * | 2/2002 | Kramer .................. G06F 3/016 345/156 |

(Continued)

FOREIGN PATENT DOCUMENTS

| CN | 101983370 A | 3/2011 |
| CN | 103873670 A | 6/2014 |

(Continued)

*Primary Examiner* — Jeff Piziali
(74) *Attorney, Agent, or Firm* — Sheppard Mullin Richter & Hampton LLP

(57) ABSTRACT

The present invention provides a method for controlling deformation of a flexible virtual reality interaction controller, comprising: determining that a posture at which a user holds a VR interaction controller is changed; determining, according to a feature of the changed holding posture, an object to be simulated by the VR interaction controller; determining, according to a shape of the object to be simulated and a shape of the VR interaction controller before the holding posture is changed, a deformation parameter of the VR interaction controller; and controlling, according to the deformation parameter, the VR interaction controller to generate deformation. The present invention also discloses an apparatus for controlling deformation of a flexible VR interaction controller and a VR interaction system. By adopting the technical solutions of the present invention, a more concrete VR interaction controller is provided for a user, thereby improving the user experience.

18 Claims, 11 Drawing Sheets

(51) Int. Cl.
*G06F 3/00* (2006.01)
*G06F 3/03* (2006.01)

(56) References Cited

U.S. PATENT DOCUMENTS

| | | | |
|---|---|---|---|
| 2004/0075676 A1* | 4/2004 | Rosenberg | A63F 13/06 |
| | | | 715/701 |
| 2005/0073496 A1* | 4/2005 | Moore | G05G 9/047 |
| | | | 345/156 |
| 2009/0184923 A1* | 7/2009 | Schena | G01D 7/007 |
| | | | 345/156 |
| 2011/0025651 A1 | 2/2011 | Buil et al. | |
| 2012/0032879 A1* | 2/2012 | Berkley | G06F 3/016 |
| | | | 345/156 |
| 2014/0274398 A1* | 9/2014 | Grant | G06F 3/0338 |
| | | | 463/37 |
| 2015/0277854 A1 | 10/2015 | Zhang | |
| 2015/0355711 A1* | 12/2015 | Rihn | G06F 3/011 |
| | | | 340/407.2 |
| 2016/0274662 A1* | 9/2016 | Rimon | G06F 3/016 |

FOREIGN PATENT DOCUMENTS

| | | |
|---|---|---|
| CN | 104955285 A | 9/2015 |
| CN | 105094646 A | 11/2015 |

\* cited by examiner

METHOD AND APPARATUS FOR CONTROLLING DEFORMATION OF FLEXIBLE VIRTUAL REALITY INTERACTION CONTROLLER, AND VIRTUAL REALITY INTERACTION SYSTEM

CROSS REFERENCE TO RELATED APPLICATION

The present application is based on and claims the benefit of priority to Chinese Application No. 201510992145.9, filed on Dec. 24, 2015, the entire contents of which are incorporated herein by reference.

TECHNICAL FIELD

The present invention relates to the field of human-machine interactions, and in particular, to a method and an apparatus for controlling deformation of a flexible virtual reality interaction controller, and a virtual reality interaction system.

BACKGROUND

The virtual reality (full name in English: Virtual Reality, and referred to as VR for short) technology is a significant aspect of the simulation technology, and the VR technology enables a user to enter a virtual world that is different from a physical environment in which the user is located through multi-dimensional sensory stimulations, for example, a visual sense, an auditory sense, a sense of touch, and an olfactory sense. An ideal VR should have all sensing functions possessed by a human being.

In a conventional VR system, interactions between an individual and content that is displayed and presented virtually are implemented basically through a VR interaction controller (for example, a glove, an operating rod, a handle, a helmet, or glasses). The multi-dimensional sensing stimulations are also basically provided by the VR interaction controller. For example, a three-dimensional visual feedback may be provided for a user by displaying two images having a disparity on display screens for left and right eyes of the user, respectively. For another example, a vivid auditory sense may be provided for a user by providing different sounds that are recorded at different positions for left and right ears of the user. Still for example, a feedback in a sense of touch may be provided for a user by disposing some touch spots capable of vibrating on a VR interaction controller.

However, the existing VR interaction controller still is relatively fixed in the physical shape, for example, in a rod shape. In this case, the user experience, especially, the immersive experience, is always diminished.

SUMMARY

An objective of the present invention is: providing a method and an apparatus for controlling deformation of a flexible virtual reality interaction controller, and a virtual reality interaction system.

A first aspect of at least one embodiment of the present invention provides a method for controlling deformation of a flexible virtual reality interaction controller, wherein the method comprises:

determining that a posture at which a user holds a VR interaction controller is changed;

determining, according to a feature of the changed holding posture, an object to be simulated by the VR interaction controller;

determining, according to a shape of the object to be simulated and a shape of the VR interaction controller before the holding posture is changed, a deformation parameter of the VR interaction controller; and controlling, according to the deformation parameter, the VR interaction controller to generate deformation.

A second aspect of at least one embodiment of the present invention provides an apparatus for controlling deformation of a flexible virtual reality interaction controller, wherein the apparatus comprises:

a posture change determining module, configured to determine that a posture at which a user holds a VR interaction controller is changed;

a simulated object determining module, configured to determine, according to a feature of the changed holding posture, an object to be simulated by the VR interaction controller;

a deformation parameter determining module, configured to determine, according to a shape of the object to be simulated and a shape of the VR interaction controller before the holding posture is changed, a deformation parameter of the VR interaction controller; and a deformation control module, configured to control, according to the deformation parameter, the VR interaction controller to generate deformation.

A third aspect of at least one embodiment of the present invention provides a VR interaction system, wherein the system comprises a storage, a processor, and a flexible VR interaction controller, wherein the storage is configured to store an instruction, and the processor is configured to perform the instruction, so as to perform the following steps:

determining that a posture at which a user holds the VR interaction controller is changed;

determining, according to a feature of the changed holding posture, an object to be simulated by the VR interaction controller;

determining, according to a shape of the object to be simulated and a shape of the VR interaction controller before the holding posture is changed, a deformation parameter of the VR interaction controller; and controlling, according to the deformation parameter, the VR interaction controller to generate deformation.

By using the method and the apparatus for controlling deformation of a flexible virtual reality interaction controller, and the virtual reality interaction system in the embodiments of the present invention, a shape of a VR interaction controller is controlled to change according to a change in a holding posture of a user. Therefore, a more concrete VR interaction controller is provided for a user, thereby improving the user experience.

DETAILED DESCRIPTION

Specific implementations of the present invention are described in further detail below with reference to the accompanying drawings and embodiments. The following embodiments are intended to describe the present invention, but not to limit the scope of the present invention.

It should be understood by a person skilled in the art that in various embodiments of the present invention, the value of the serial number of each step described above does not mean an execution sequence, and the execution sequence of each step should be determined according to the function and internal logic thereof, and should not be any limitation on the implementation procedure of the embodiments of the present invention.

In addition, the terms such as "first" and "second" in the present invention are only used to differentiate different steps, devices or modules, and the terms neither represent any specific technical meaning, nor represent a inexorable logic sequence between the steps, the devices, or the modules.

Figure 1:
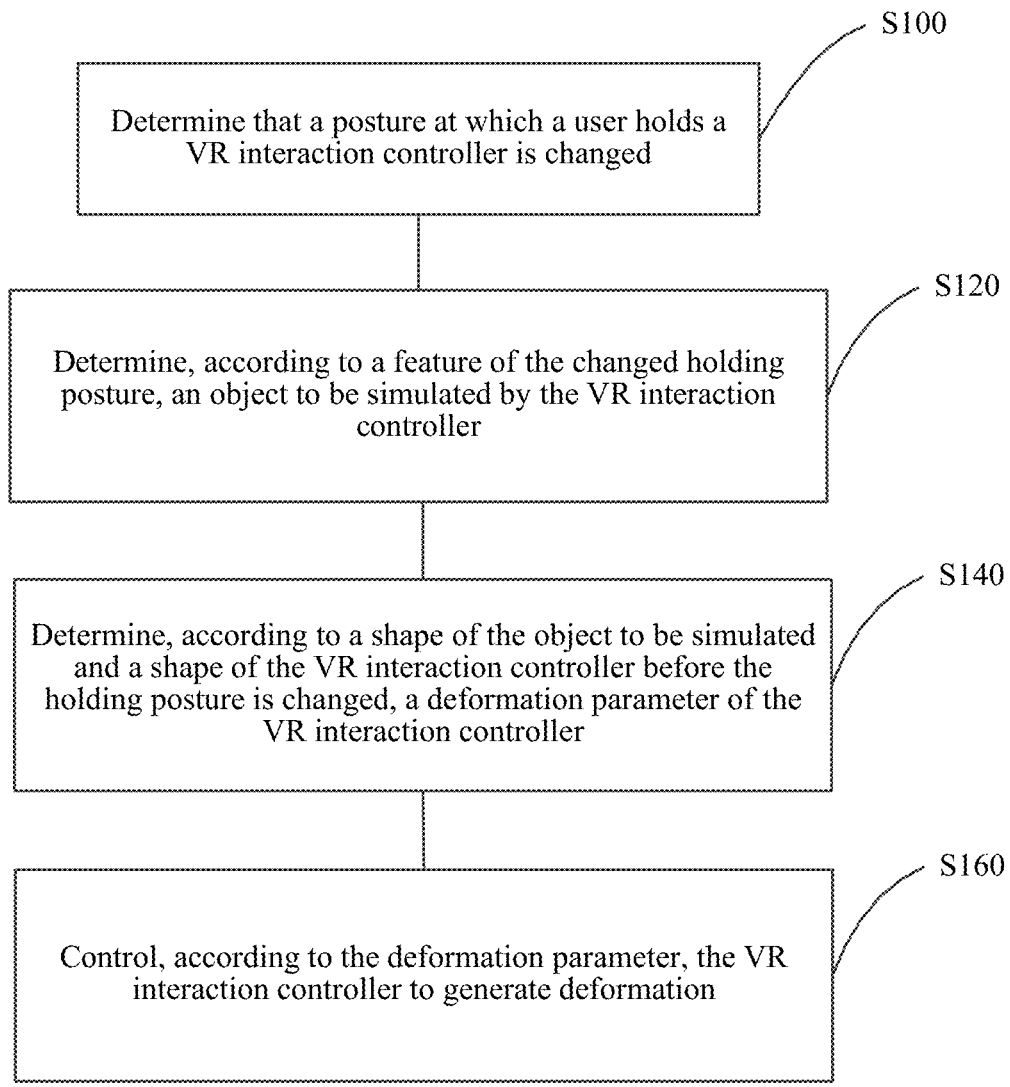
FIG. 1 is a flow chart of a method for controlling deformation of a flexible VR interaction controller of an embodiment of the present invention.

FIG. 1 is a flow chart of a method for controlling deformation of a flexible VR interaction controller of an embodiment of the present invention. As shown in FIG. 1, the method may comprise:

S100: Determine that a posture at which a user holds a VR interaction controller is changed.

S120: Determine, according to a feature of the changed holding posture, an object to be simulated by the VR interaction controller.

S140: Determine, according to a shape of the object to be simulated and a shape of the VR interaction controller before the holding posture is changed, a deformation parameter of the VR interaction controller.

S160: Control, according to the deformation parameter, the VR interaction controller to generate deformation.

By adopting the method in the embodiment of the present invention, a shape of a VR interaction controller is controlled to change according to a change in a holding posture of a user. Therefore, a more concrete VR interaction controller is provided for the user, thereby improving the user experience.

In the embodiment of the present invention, the VR interaction controller may be a hardware device that is made of a flexible material and used by a user to interact with virtual content, comprise but not limited to: a glove, an operating rod, a handle, a headgear, or a foot cover, and be referred to as "flexible VR interaction controller" for short in the following embodiments of the present invention.

Figure 2:
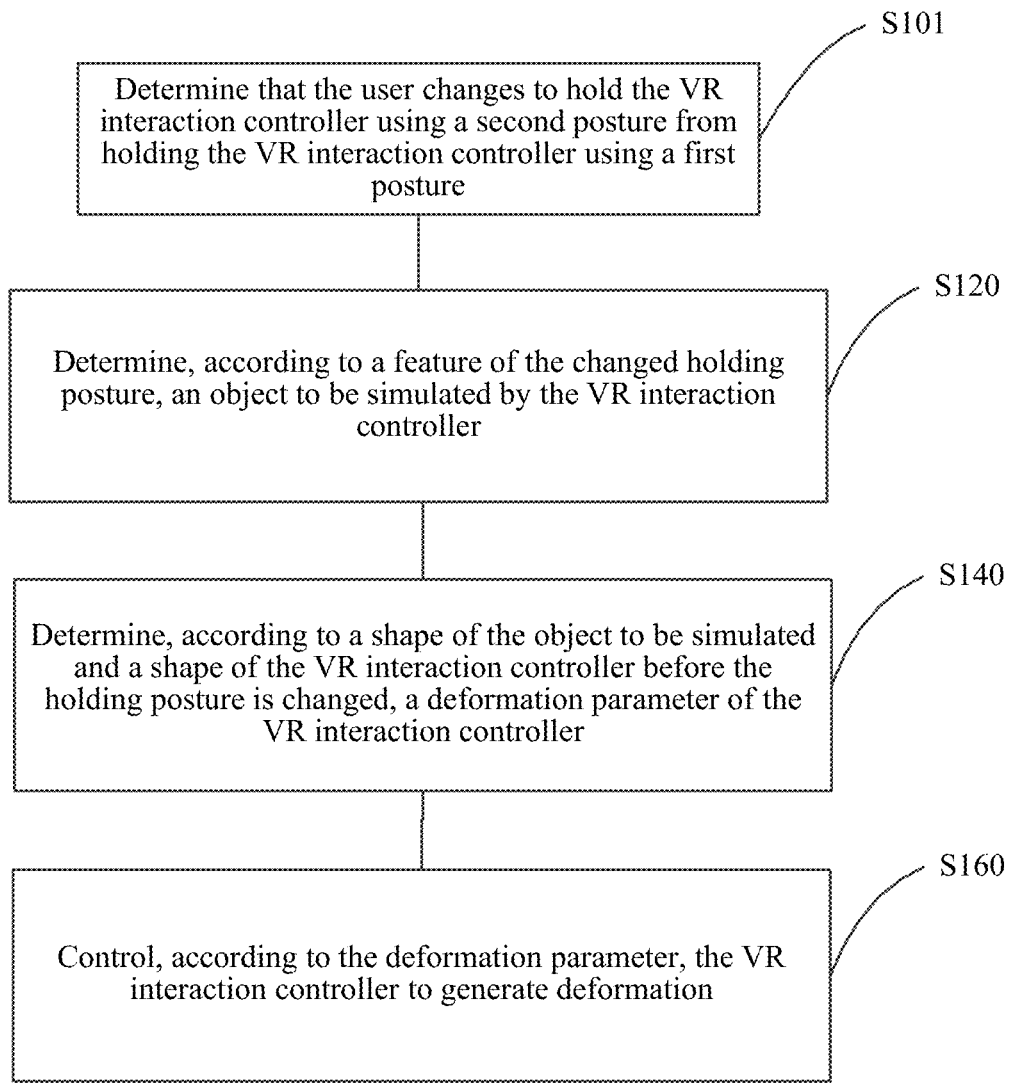
FIG. 2 is a flow chart of a method for controlling deformation of a flexible VR interaction controller of another embodiment of the present invention.

Optionally, as shown in FIG. 2, the determining that the posture at which the user holds the VR interaction controller is changed (S100) may comprise:

S101: Determine that the user changes to hold the VR interaction controller using a second posture from holding the VR interaction controller using a first posture, wherein when the user holds the VR interaction controller using the first posture, the VR interaction controller simulates a first object, and a shape of the VR interaction controller is a shape of the first object.

In an optional implementation, a user primarily holds a VR interaction controller (for example, an operating rod) using a first posture (for example, using one hand), and then the user changes to hold the VR interaction controller using a second posture (for example, two hands) probably because of a need of content presented by the virtual reality. In the foregoing example, when the user holds the operating rod using a single-hand posture, what is simulated by the operating rod is a handgun. Therefore, the operating rod made of a flexible material is in a shape of a handgun.

Figure 3:
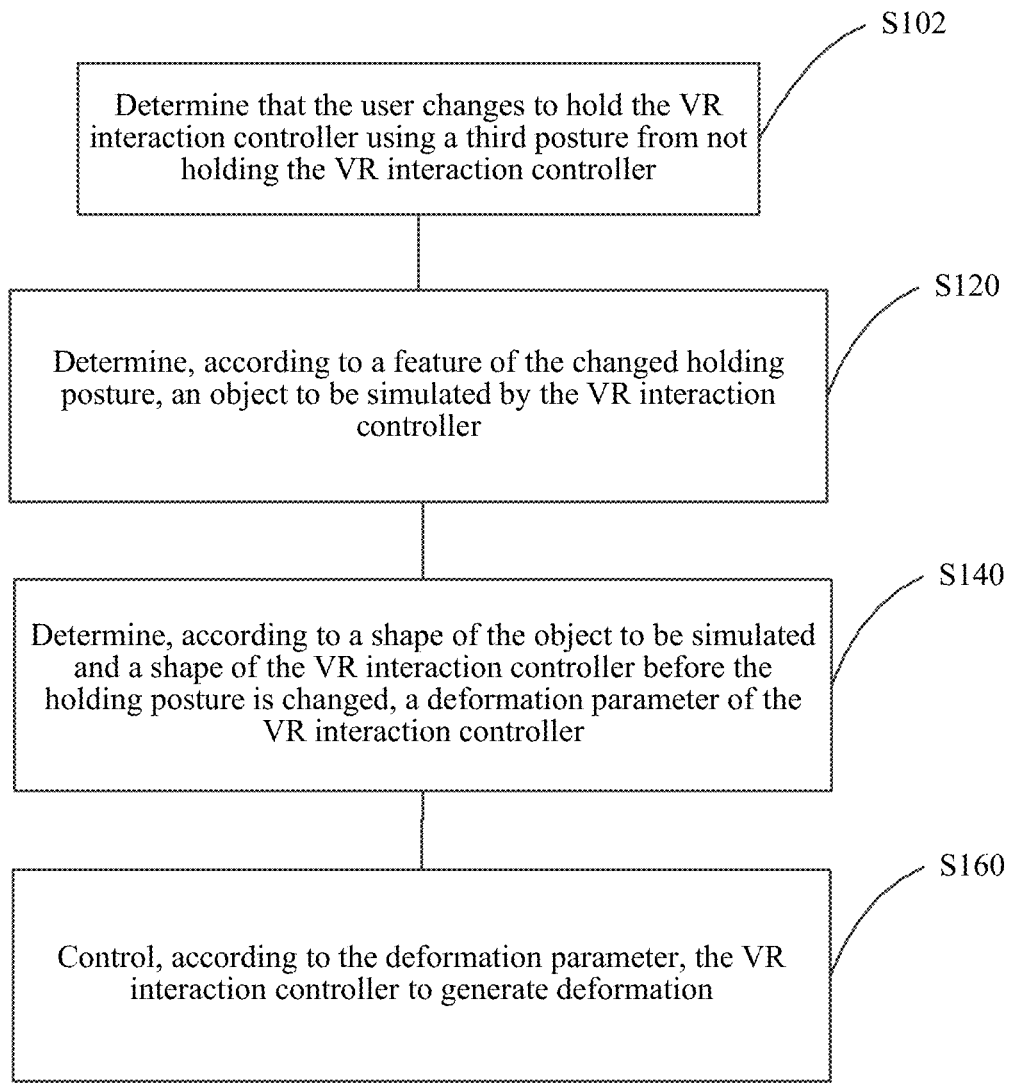
FIG. 3 is a flow chart of a method for controlling deformation of a flexible VR interaction controller of still another embodiment of the present invention.

Optionally, as shown in FIG. 3, the determining that the posture at which the user holds the VR interaction controller is changed (S100) may further comprise:

S102: Determine that the user changes to hold the VR interaction controller using a third posture from not holding the VR interaction controller, wherein when the user does not hold the VR interaction controller, a shape of the VR interaction controller is an initial shape.

In still another optional implementation, the user primarily may not hold any VR interaction controller (for example, a user newly enters a VR environment, and has not yet interacted with any virtual content), and then the user changes to hold the VR interaction controller using the third posture (for example, picking up with one hand). In the foregoing example, when the user does not hold the VR interaction controller, a shape of the VR interaction controller is an initial shape of the VR interaction controller, for example, a rod shape.

Figure 4:
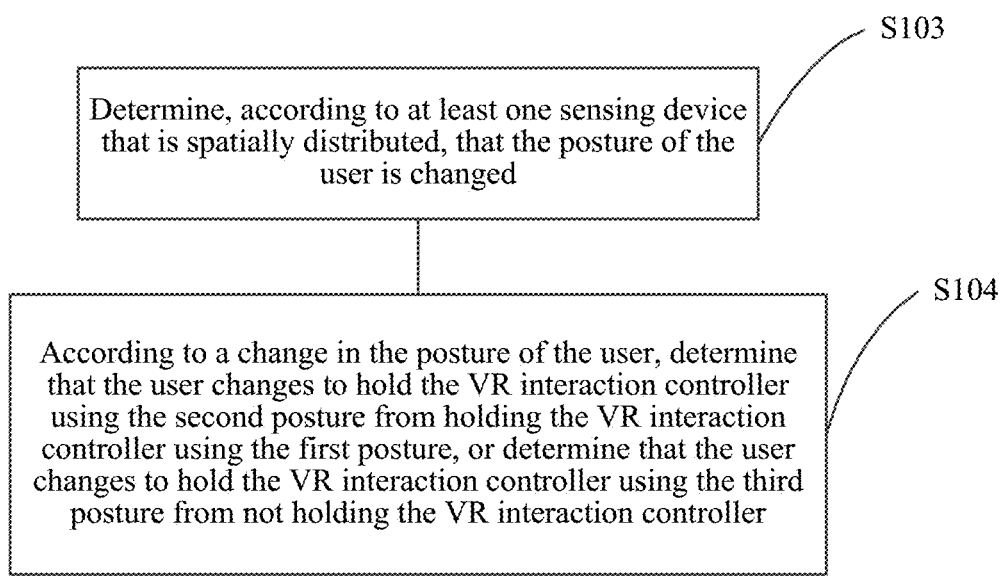
FIG. 4 is a schematic diagram of a specific implementation of S101 or S102 in the embodiments of the present invention.

Optionally, as shown in FIG. 4, in another optional implementation of the present invention, the determining that the user changes to hold the VR interaction controller using a second posture from holding the VR interaction controller using a first posture in S101, or the determining that the user changes to hold the VR interaction controller using a third posture from not holding the VR interaction controller in S102 may comprise:

S103: Determine, according to at least one sensing device that is spatially distributed, that the posture of the user is changed.

S104: According to a change in the posture of the user, determine that the user changes to hold the VR interaction controller using the second posture from holding the VR interaction controller using the first posture, or determine that the user changes to hold the VR interaction controller using the third posture from not holding the VR interaction controller.

Figure 5:
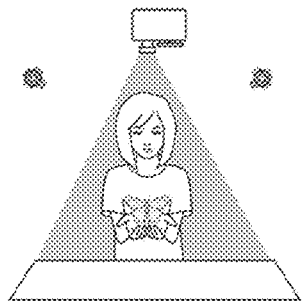
FIG. 5 is a schematic diagram of a specific application scenario of the present invention.

In a specific implementation, the at least one sensing device may be at least one camera. As shown in FIG. 5, a user may be filmed by at least one camera that is spatially distributed, and according to a static image or a dynamic image of the user acquired by the at least camera, it is determined that the posture of the user is changed.

In another specific implementation, the at least one sensing device may be at least one ultrasonic signal transceiver, and a reflected ultrasonic signal that is generated after an ultrasonic signal sent by an acoustic resonator (full name in English: Acoustic Resonators) (for example, a microphone) encounters a user in a process of transmission in space is monitored by a transducer array (full name in English: Transducer Array) (for example, a microphone array). A change in a posture of the user may influence a feature of the reflected ultrasonic signal, for example, the aptitude or a phase position of the signal. Therefore, whether the posture of the user is changed can be determined through the reflected ultrasonic signal received by the ultrasonic signal transceiver.

In still another specific implementation, the at least one sensing device may be at least one wireless local area network (full name in English: Wireless Local Area Networks, and referred to as WLAN for short) signal transceiver. Whether the posture of the user is changed can be determined through the reflected wireless local area network signal received by the wireless local area network signal transceiver. The principles are similar to those of the implementation of the ultrasonic signal transceiver, and details are not described herein again.

Figure 6:
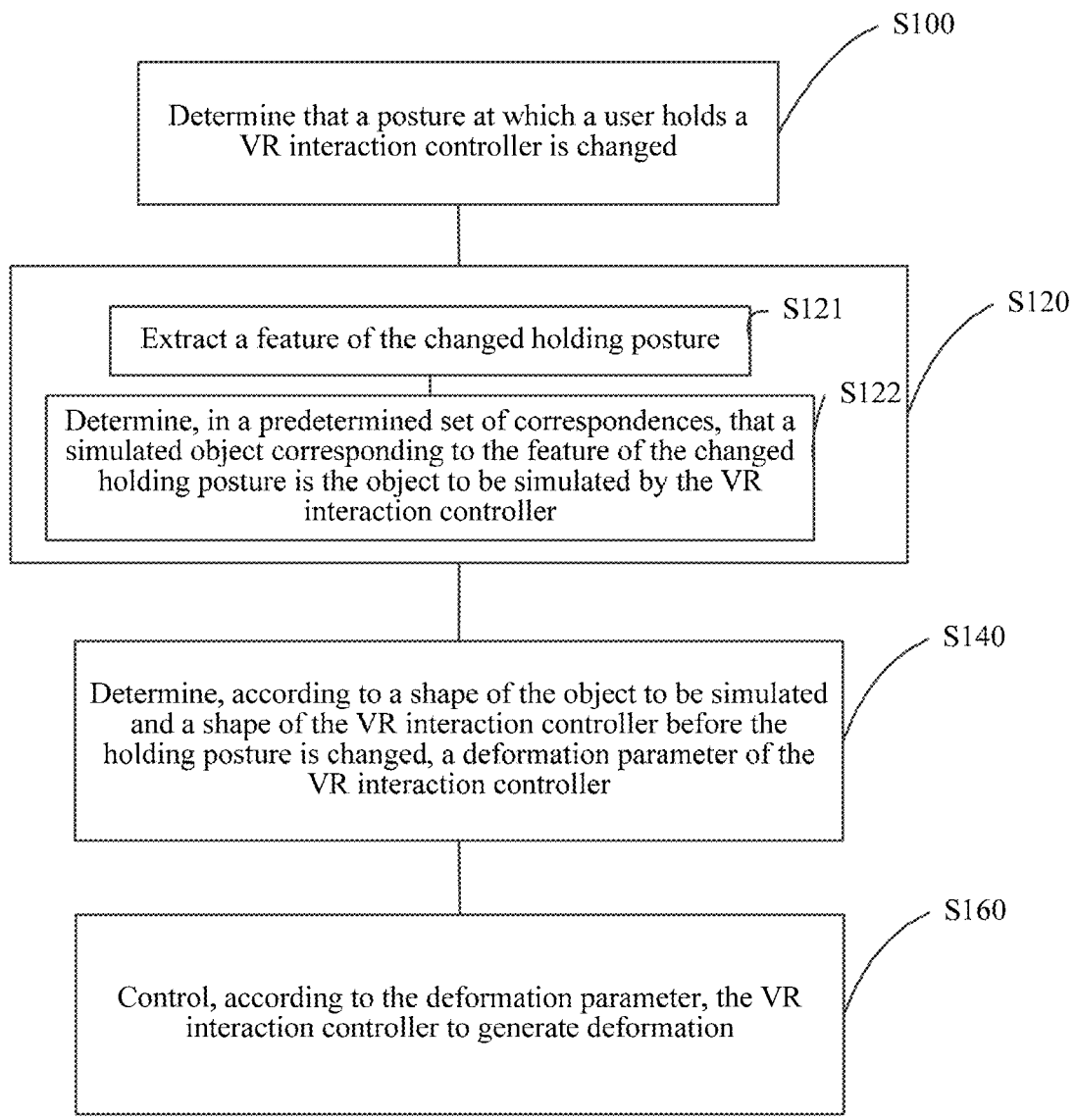
FIG. 6 is a flow chart of a method for controlling deformation of a flexible VR interaction controller of still another embodiment of the present invention.

Optionally, as shown in FIG. 6, in another optional implementation of the present invention, the determining, according to a feature of the changed holding posture, an object to be simulated by the VR interaction controller in S120 may comprise:

S121: Extract a feature of the changed holding posture.

S122: Determine, in a predetermined set of correspondences, that a simulated object corresponding to the feature of the changed holding posture is the object to be simulated by the VR interaction controller, wherein the set of correspondences comprises at least one correspondence between a feature and a simulated object.

Exemplarily, a feature of a changed holding posture, for example, a contour feature or a region feature, can be extracted based on an image processing technology, after the changed holding posture (for example, the second posture or the third posture) is determined according to at least one sensing device that is spatially distributed.

According to the extracted feature, a simulated object corresponding to the extracted feature is found in a predetermined set of correspondences. The predetermined set of correspondences may be in a form shown in the following table:

TABLE 1

Features of the holding postures

| Feature vector 1 | Feature vector 2 | Relative position relationship vector between the feature vectors | Simulated object |
| --- | --- | --- | --- |
| Vector A1 | Vector B1 | P1 | Long-barreled gun |
| Vector A2 | Vector B2 | P2 | Tennis racket |
| 0 | Vector B3 | P3 | Short-barreled gun |
| 0 | Vector B4 | P4 | Table tennis racket |
| ... | ... | ... | ... |

The feature vector may be used to indicate a posture of a part of a user body that participate in holding of a VR interaction controller (for example, one hand or two hands of a user, one foot or two feet of a user, a head of a user, or a trunk of a user), and exemplarily, may comprise the following information: a geometrical feature of a contour, an orientation of a contour, a centroid of a contour, and the like.

A changed holding posture of a user can be identified through a change of one same body part in a dynamic image or by comparing a relationship among a plurality of body parts in one same static image with a predetermined feature.

For example, the vector A1 and the vector B1 may be a predetermined feature vector of a posture of a left hand and a predetermined feature vector of a posture of a right hand, respectively, and a relative position relationship vector between the vector A1 and the vector B1 is P1. Therefore, if it is acquired from one same static image that each of the distance between a feature vector A1' and the vector A1 of the posture of the left hand, the distance between a feature vector B1' and the vector B1 of the posture of the right hand, and the distance between a relative position relationship vector P1' of the vector A1' and the vector B1', and the vector P1 is less than a predetermined threshold after the user has changed the holding posture, it can be considered that: after the user changed the holding posture, the posture of the left hand is the posture indicated by the vector A1, the posture of the right hand is the posture indicated by the vector B1, and the relative position between the left hand and the right hand satisfies a predetermined condition. Therefore, it can be determined, according to the foregoing table, that the object simulated by the VR interaction controller corresponding to the changed holding posture of the user is a long-barreled gun.

For another example, the vector 0 and the vector B4 are a feature vector of the posture at a time t1 and a feature vector of the posture at a time t2, respectively, and P4 is a relative position relationship vector between the posture at the time t1 and the posture at the time t2. Therefore, if it is acquired from a segment of a dynamic image that each of the distance between a feature vector A4' of the posture of the right hand before the user changes the holding posture and the vector 0, the distance between a feature vector B4' of the posture of the right hand after the holding posture is changed and the vector B4, and the distance between a relative position relationship vector P4' of the vector B4' and the vector A4', and the vector P4 is less than a predetermined threshold, it can be considered that: after the user changes the holding posture, the posture of the right hand is the posture indicated by the vector B4, and/or a relative position of the right hand at the two successive times satisfies a predetermined condition. Therefore, it can be determined, according to the foregoing table, that the object simulated by the VR interaction controller corresponding to the changed holding posture of the user is a table tennis racket.

The set of correspondences comprises at least one correspondence between a feature of a posture and a simulated object. Exemplarily, such the correspondence may be a one-to-one correspondence, or may also be a one-to-multiple correspondence. That is, one feature may correspond to one simulated object, or may also correspond to multiple simulated objects.

Optionally, if one feature corresponds to multiple simulated objects, a menu option may be provided for a user (for example, the menu option is projected onto glasses or a helmet wore by the user) when an object to be simulated by the VR interaction controller is finally determined, and the user selects or confirms the object to be simulated by the VR interaction controller.

Figure 7:
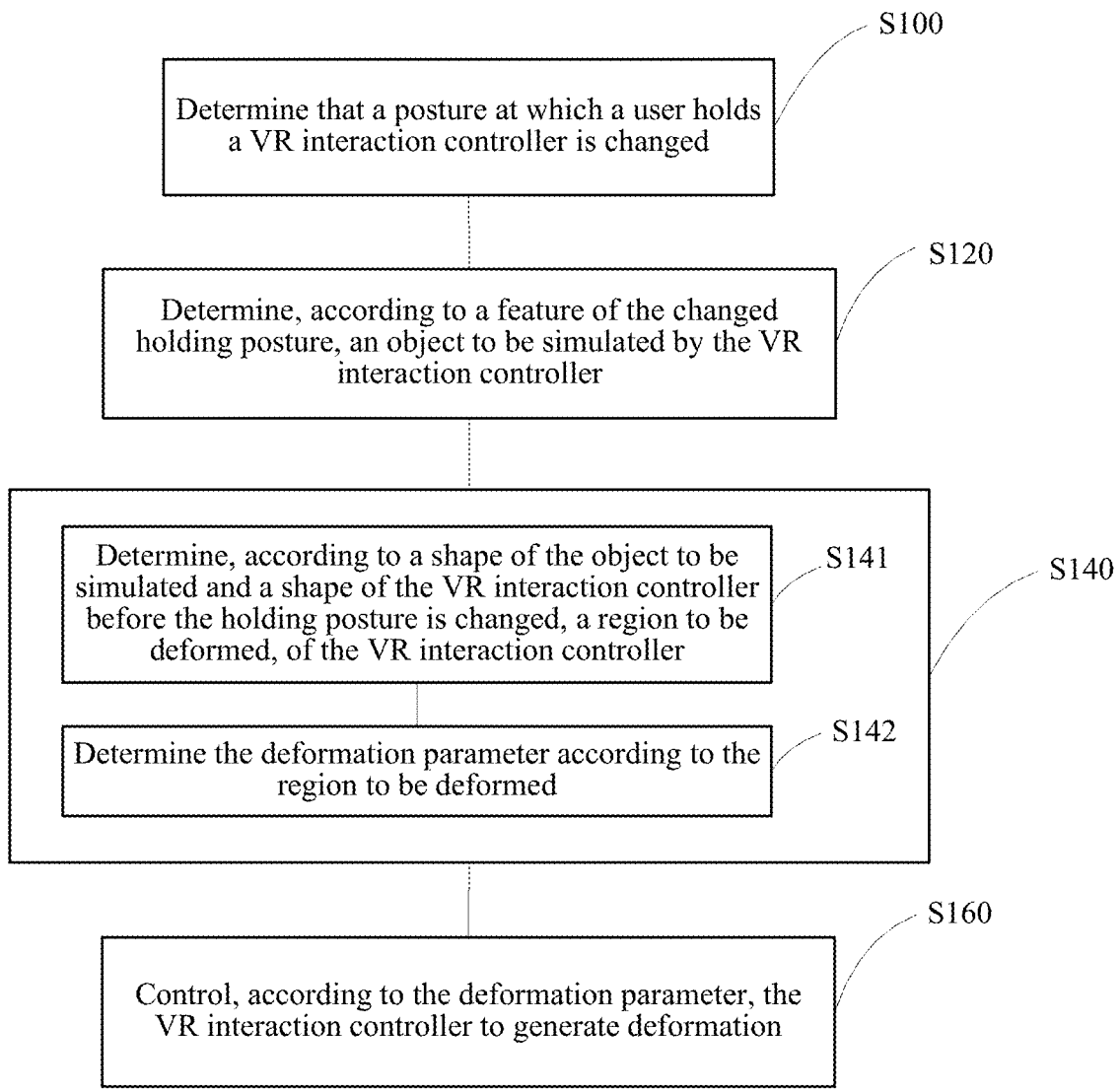
FIG. 7 is a flow chart of a method for controlling deformation of a flexible VR interaction controller of still another embodiment of the present invention.

Optionally, as shown in FIG. 7, in another optional embodiment of the present invention, the determining, according to a shape of the object to be simulated and a shape of the VR interaction controller before the holding posture is changed, a deformation parameter of the VR interaction controller in S140 may comprise:

S141: Determine, according to a shape of the object to be simulated and a shape of the VR interaction controller before the holding posture is changed, a region to be deformed, of the VR interaction controller.

S142: Determine the deformation parameter according to the region to be deformed.

Because the object to be simulated by the VR interaction controller has been determined in S120, a shape into which the VR interaction controller changes is also determined. Regions/parts of the VR interaction controller that need to be deformed can be determined according to the shape into which the VR interaction controller changes and a current shape (that is, a shape of the VR interaction controller before the holding posture of the user is changed). A deformation parameter can be obtained according to the regions/parts that need to be deformed.

The VR interaction controller can be controlled to generate deformation according to the obtained deformation parameter. For example, the VR interaction controller may be enabled to generate deformation by changing a light field, thermal field, electric field, or magnetic field applied onto the VR interaction controller.

Figure 8:
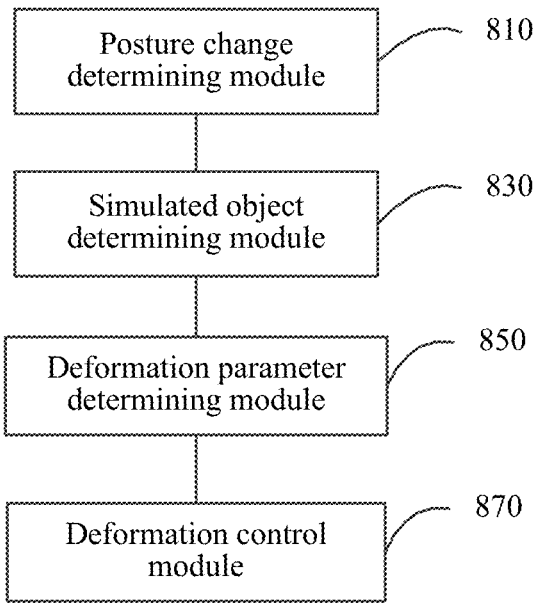
FIG. 8 is a modular and structural schematic diagram of an apparatus for controlling deformation of a flexible virtual reality interaction controller of an embodiment of the present invention.

FIG. 8 is a modular and structural schematic diagram of an apparatus for controlling deformation of a flexible virtual reality interaction controller of an embodiment of the present invention. The apparatus may be an independent entity device, or may also be one or more chips, a part of circuit, or one or more functional modules. As shown in FIG. 8, the apparatus may comprise:

a posture change determining module 810, configured to determine that a posture at which a user holds a VR interaction controller is changed;

a simulated object determining module 830, configured to determine, according to a feature of the changed holding posture, an object to be simulated by the VR interaction controller;

a deformation parameter determining module 850, configured to determine, according to a shape of the object to be simulated and a shape of the VR interaction controller before the holding posture is changed, a deformation parameter of the VR interaction controller; and a deformation control module 870, configured to control, according to the deformation parameter, the VR interaction controller to generate deformation.

By adopting the apparatus in the embodiment of the present invention, a shape of a VR interaction controller is controlled to change according to a change in a holding posture of a user. Therefore, a more concrete VR interaction controller is provided for the user, thereby improving the user experience.

Figure 9:
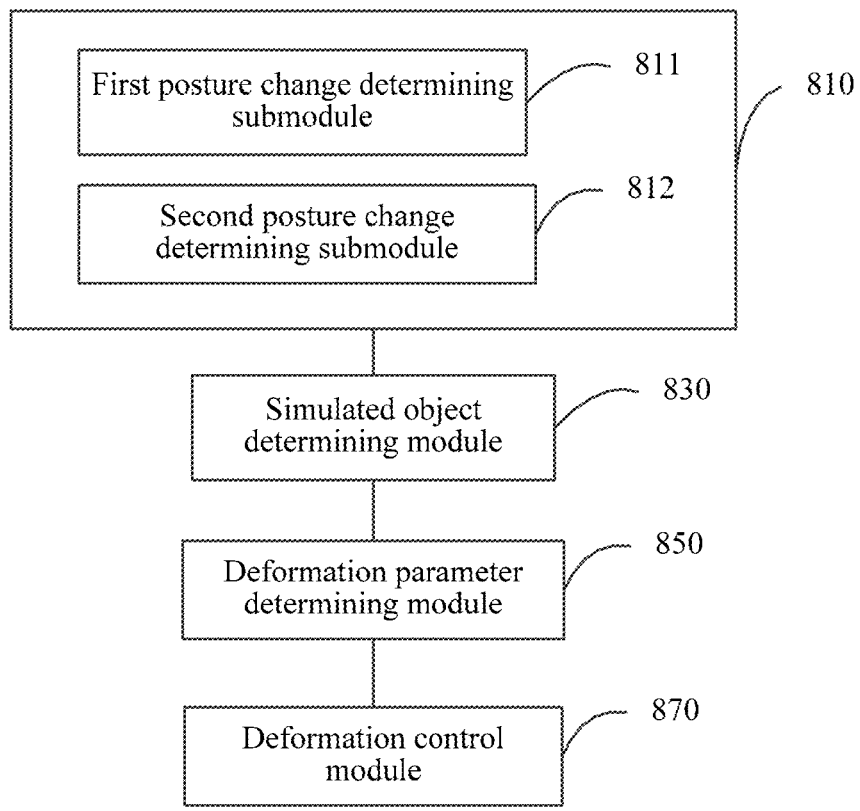
FIG. 9 is a modular and structural schematic diagram of an apparatus for controlling deformation of a flexible virtual reality interaction controller of another embodiment of the present invention.

Optionally, as shown in FIG. 9, in an optional implementation, the posture change determining module 810 may comprise:

a first posture change determining submodule 811, configured to determine that the user changes to hold the VR interaction controller using a second posture from holding the VR interaction controller using a first posture, wherein when the user holds the VR interaction controller using the first posture, the VR interaction controller simulates a first object, and a shape of the VR interaction controller is a shape of the first object; and/or a second posture change determining submodule 812, configured to determine that the user changes to hold the VR interaction controller using a third posture from not holding the VR interaction controller, wherein when the user does not hold the VR interaction controller, a shape of the VR interaction controller is an initial shape.

Figure 10A:
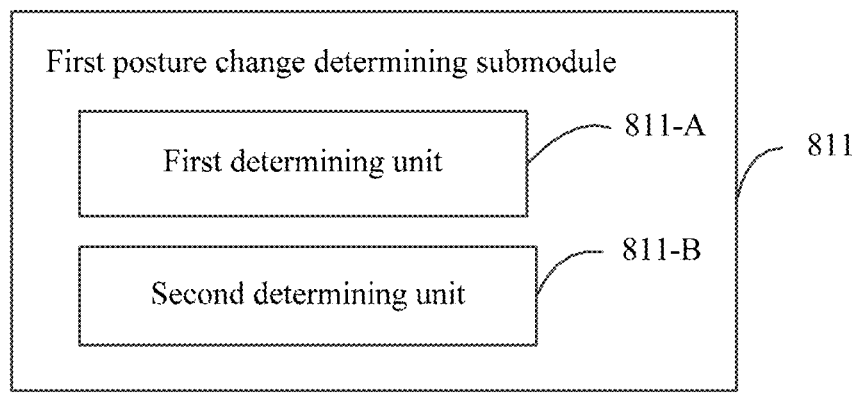
FIG. 10a is a structural schematic diagram of a first posture change determining submodule 811 in an embodiment of the present invention.

Optionally, as shown in FIG. 10a, in an optional implementation, the first posture change determining submodule 811 may comprise:

a first determining unit 811-A, configured to determine, according to at least one sensing device that is spatially distributed, that the posture of the user is changed; and a second determining unit 811-B, configured to determine, according to a change in the posture of the user, that the user changes to hold the VR interaction controller using the second posture from holding the VR interaction controller using the first posture.

Figure 10B:
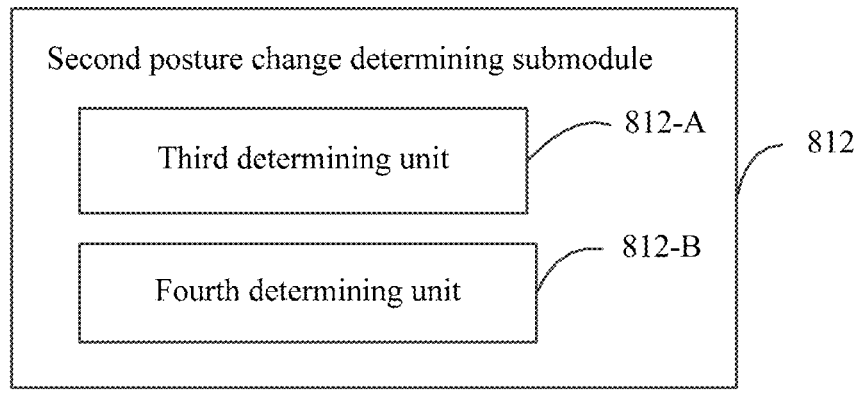
FIG. 10b is a structural schematic diagram of a second posture change determining submodule 812 in an embodiment of the present invention.

Optionally, as shown in FIG. 10b, in an optional implementation, the second posture change determining submodule 812 may comprise:

a third determining unit 812-A, configured to determine, according to at least one sensing device that is spatially distributed, that the posture of the user is changed; and a fourth determining unit 812-B, configured to determine, according to a change in the posture of the user, that the user changes to hold the VR interaction controller using a third posture from not holding the VR interaction controller.

Figure 11:
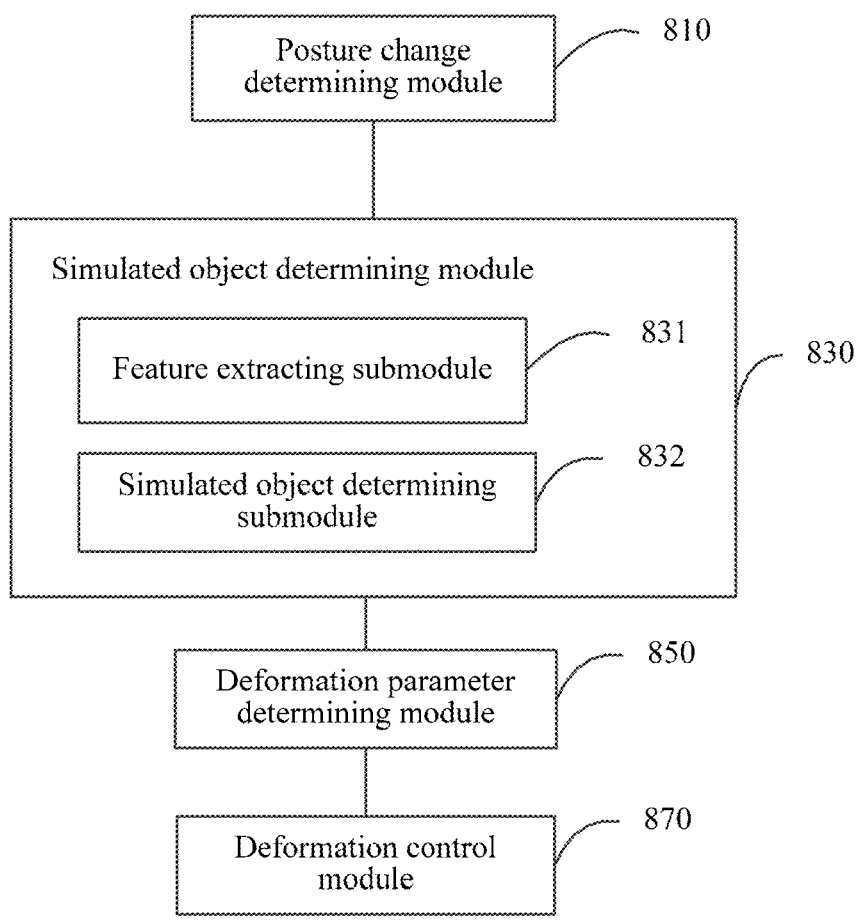
FIG. 11 is a modular and structural schematic diagram of an apparatus for controlling deformation of a flexible virtual reality interaction controller of another embodiment of the present invention.

Optionally, as shown in FIG. 11, in an optional implementation, the simulated object determining module 830 may comprise:

a feature extracting submodule 831, configured to extract a feature of the changed holding posture; and a simulated object determining submodule 832, configured to determine, in a predetermined set of correspondences, that a simulated object corresponding to the feature of the changed holding posture is the object to be simulated by the VR interaction controller, wherein the set of correspondences comprises at least one correspondence between a feature and a simulated object.

Figure 12:
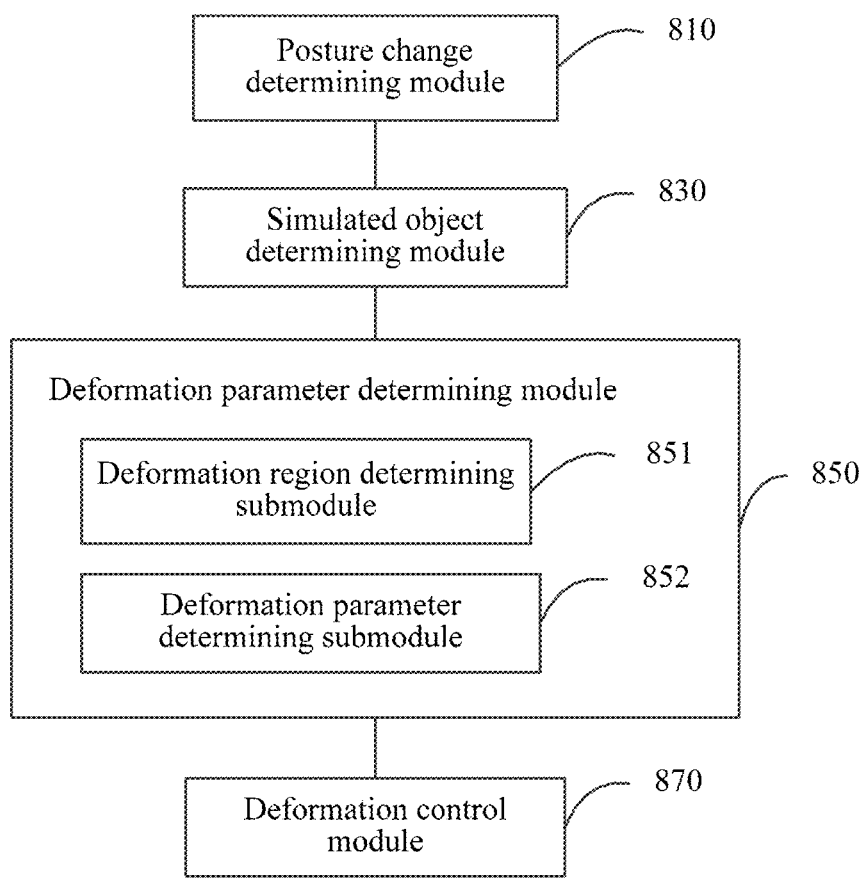
FIG. 12 is a modular and structural schematic diagram of an apparatus for controlling deformation of a flexible virtual reality interaction controller of another embodiment of the present invention.

Optionally, as shown in FIG. 12, in an optional implementation, the deformation parameter determining module 850 may comprise:

a deformation region determining submodule 851, configured to determine, according to a shape of the object to be simulated and a shape of the VR interaction controller before the holding posture is changed, a region to be deformed, of the VR interaction controller; and a deformation parameter determining submodule 852, configured to determine the deformation parameter according to the region to be deformed.

Figure 13:
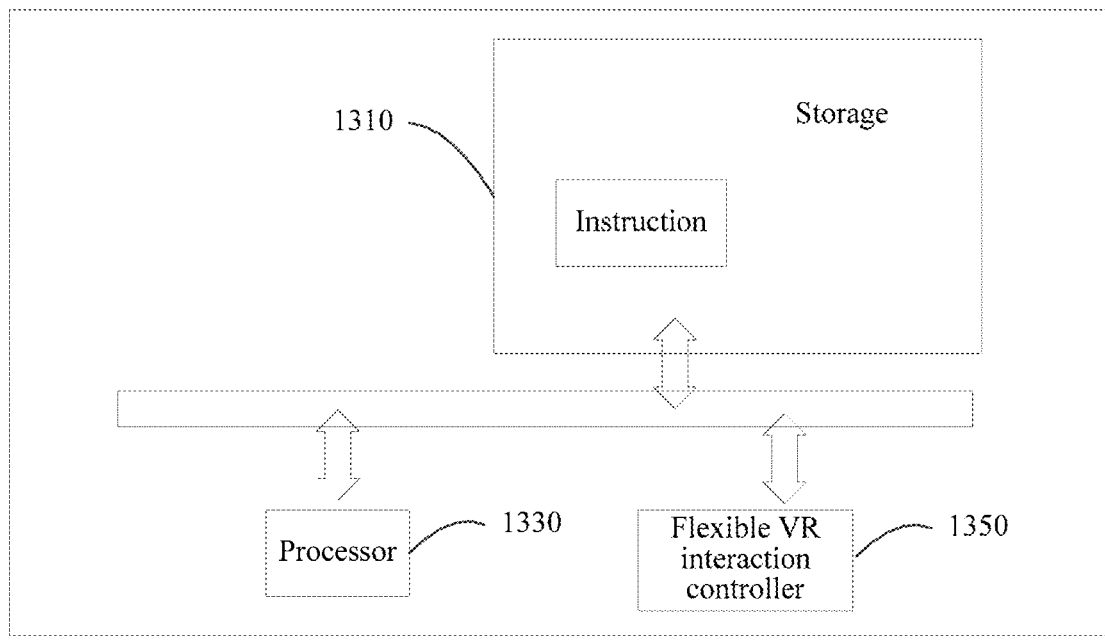
FIG. 13 is a schematic diagram of a VR interaction system of an embodiment of the present invention.

FIG. 13 is a schematic diagram of a VR interaction system provided by another embodiment of the present invention. Referring to FIG. 13, the VR interaction system may comprise:

a storage 1310, a processor 1330, and a flexible VR interaction controller 1350, wherein the storage 1310 is configured to store an instruction; and the processor 1330 is configured to perform the following steps:

determining that a posture at which a user holds the VR interaction controller 1350 is changed;

determining, according to a feature of the changed holding posture, an object to be simulated by the VR interaction controller 1350;

determining, according to a shape of the object to be simulated and a shape of the VR interaction controller 1350 before the holding posture is changed, a deformation parameter of the VR interaction controller 1350; and controlling, according to the deformation parameter, the VR interaction controller 1350 to generate deformation.

Preferably, the storage 1310 and/or the processor 1330 may be integrated in the VR interaction controller 1350.

It may be clearly understood by a person skilled in the art that, for the purpose of convenient and brief description, reference may be made to the description of corresponding procedures in the foregoing method embodiments of the method for controlling deformation of a flexible virtual reality interaction controller, for the specific working procedures of the previously described apparatus for controlling deformation of a flexible virtual reality interaction controller and VR interaction system, and details are not described herein again.

In view of the above, by adopting the VR interaction system in the embodiment of the present invention, a shape of a VR interaction controller is controlled to change according to a change in a holding posture of a user. Therefore, a more concrete VR interaction controller is provided for the user, thereby improving the user experience.

A person of ordinary skill in the art may be aware that, in combination with the examples described in the embodiments disclosed in this specification, units and steps of the method may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

When the functions are implemented in a form of a software functional unit and sold or used as an independent product, the functions may be stored in a computer-readable storage medium. Based on such an understanding, the technical solutions of the present invention essentially, or the part contributing to the existing art, or all or a part of the technical solutions may be implemented in the form of a software product. The software product is stored in a storage medium and comprises several instructions for instructing a computer device (which may be a personal computer, a controller, or a network device) or a processor to perform all or a part of the steps of the methods in the embodiments of the present invention. The aforementioned storage medium comprises: any medium that can store a program code, such as a USB flash drive, a removable hard disk, a Read-Only Memory (ROM), a Random Access Memory (RAM), a magnetic disk, or an optical disc.

The above implementations are only used to describe the present invention, rather than limit the present invention; and various alterations and variants can be made by a person skilled in the art without departing from the spirit and scope of the present invention, so all equivalent technical solutions also belong to the scope of the present invention, and the scope of patent protection of the present invention should be defined by claims.

What is claimed is:

1. A method for controlling a deformation of a virtual reality (VR) interaction controller, comprising:

determining that a posture of a user holding the VR interaction controller is changed;

obtaining a set of correspondences between features of a plurality of postures and a plurality of simulated objects, wherein features of different postures correspond to different simulated objects;

extracting a feature of the changed posture, wherein the extracted feature comprises a predetermined feature vector of a left hand posture, a predetermined feature vector of a right hand posture, and a relative position relationship vector between the predetermined feature vector of the left hand posture and the predetermined feature vector of the right hand posture;

determining, according to the extracted feature of the changed posture, an object to be simulated by the VR interaction controller based on the set of correspondences;

determining, according to a shape of the determined object to be simulated and a shape of the VR interaction controller before the posture of the user is changed, a deformation parameter of the VR interaction controller; and controlling, according to the deformation parameter, the VR interaction controller to generate the deformation of the VR interaction controller.

2. The method of claim 1, further comprising:

determining that the posture of the user is changed from a first posture to a second posture; and simulating an object corresponding to the first posture, wherein the shape of the VR interaction controller is a shape of the object corresponding to the first posture.

3. The method of claim 1, wherein the determining that a posture at which a user holds a VR interaction controller is changed comprises:

determining that the posture of the user changes to a third posture from not holding the VR interaction controller, wherein when the user does not hold the VR interaction controller, a shape of the VR interaction controller is an initial shape.

4. The method of claim 2, wherein a change of the posture is determined according to at least one sensing device that is spatially distributed, and the change of the posture includes the user changing from not holding the VR interaction controller to holding the VR interaction controller.

5. The method of claim 4, wherein the at least one sensing device comprises: at least one camera.

6. The method of claim 5, wherein the change of the posture is determined according to a static image or a dynamic image of the user acquired by the at least one camera.

7. The method of claim 4, wherein the at least one sensing device comprises: at least one ultrasonic signal transceiver.

8. The method of claim 7, wherein the change of the posture being determined according to at least one sensing device that is spatially distributed, comprises:

determining, according to a reflected ultrasonic signal received by the at least one ultrasonic signal transceiver that is spatially distributed, that the posture of the user is changed, wherein the reflected ultrasonic signal is an ultrasonic signal that is transmitted by the at least one ultrasonic signal transceiver, reflected by the user, and then returned back to the ultrasonic signal transceiver.

9. The method of claim 4, wherein the at least one sensing device comprises: at least one wireless local area network signal transceiver.

10. The method of claim 9, wherein the change of the posture being determined according to at least one sensing device that is spatially distributed, comprises:
determining, according to a transmitted ultrasonic signal received by the at least one wireless local area network signal transceiver, that the posture of the user is changed, wherein the transmitted ultrasonic signal is a wireless local area network signal that is transmitted by the at least one wireless local area network signal transceiver, reflected by the user, and then returned back to the wireless local area network signal transceiver.

11. The method of claim 1, wherein determining the deformation parameter of the VR interaction controller comprises:
determining, according to the shape of the object to be simulated and the shape of the VR interaction controller before the posture of the user is changed, a region of the VR interaction controller to be deformed; and
determining the deformation parameter according to the determined region of the VR interaction controller to be deformed.

12. An apparatus for controlling deformation of a flexible virtual reality interaction controller, comprising:
a posture change determining module, configured to determine that a posture at which a user holds a VR interaction controller is changed;
a simulated object determining module, configured to determine, according to a feature of the changed posture, an object to be simulated by the VR interaction controller based on a set of correspondences between features of a plurality of postures and a plurality of simulated objects, wherein features of different postures correspond to different simulated objects, and wherein the feature comprises a predetermined feature vector of a left hand posture, a predetermined feature vector of a right hand posture, and a relative position relationship vector between the predetermined feature vector of the left hand posture and the predetermined feature vector of the right hand posture;
a deformation parameter determining module, configured to determine, according to a shape of the object to be simulated and a shape of the VR interaction controller before the posture is changed, a deformation parameter of the VR interaction controller; and
a deformation control module, configured to control, according to the deformation parameter, the VR interaction controller to generate deformation of the VR interaction controller.

13. The apparatus of claim 12, wherein the posture change determining module comprises:
a first posture change determining submodule, configured to determine that the posture at which the user holds the VR interaction controller changes to a second posture from a first posture, wherein when the user holds the VR interaction controller using the first posture, the VR interaction controller simulates a first object corresponding to the first posture, and a shape of the VR interaction controller is a shape of the first object; and/or
a second posture change determining submodule, configured to determine that the posture at which the user holds the VR interaction controller changes to a third posture from not holding the VR interaction controller, wherein when the user does not hold the VR interaction controller, a shape of the VR interaction controller is an initial shape.

14. The apparatus of claim 13, wherein the first posture change determining submodule comprises:
a first determining unit, configured to determine, according to at least one sensing device that is spatially distributed, that the posture of the user is changed; and
a second determining unit, configured to determine, according to a change in the posture of the user, that the posture at which the user holds the VR interaction controller changes to the second posture from the first posture.

15. The apparatus of claim 13, wherein the second posture change determining submodule comprises:
a third determining unit, configured to determine, according to at least one sensing device that is spatially distributed, that the posture of the user is changed; and
a fourth determining unit, configured to determine, according to a change in the posture of the user, that the posture at which the user holds the VR interaction controller changes to the third posture from not holding the VR interaction controller.

16. The apparatus of claim 12, wherein the simulated object determining module comprises:
a feature extracting submodule, configured to extract a feature of the changed posture; and
a simulated object determining submodule, configured to determine, in the set of correspondences, that a simulated object corresponding to the feature of the changed posture is the object to be simulated by the VR interaction controller, wherein
the set of correspondences comprises at least a correspondence between one feature of the posture and a simulated object.

17. The apparatus of claim 12, wherein the deformation parameter determining module comprises:
a deformation region determining submodule, configured to determine, according to a shape of the object to be simulated and a shape of the VR interaction controller before the holding posture is changed, a region to be deformed, of the VR interaction controller; and
a deformation parameter determining submodule, configured to determine the deformation parameter according to the region to be deformed.

18. A virtual reality interaction system, wherein the system comprises: a storage, a processor, and a flexible VR interaction controller, wherein the storage is configured to store an instruction, and the processor is configured to perform the instruction, so as to perform the following steps:
determining that a posture at which a user holds the VR interaction controller is changed;
determining, according to a feature of the changed posture, an object to be simulated by the VR interaction controller based on a set of correspondences between features of a plurality of postures and a plurality of simulated objects, wherein features of different postures correspond to different simulated objects, and wherein the feature comprises a predetermined feature vector of a left hand posture, a predetermined feature vector of a right hand posture, and a relative position relationship vector between the predetermined feature vector of the left hand posture and the predetermined feature vector of the right hand posture;

determining, according to a shape of the object to be simulated and a shape of the VR interaction controller before the posture is changed, a deformation parameter of the VR interaction controller; and controlling, according to the deformation parameter, the VR interaction controller to generate deformation of the VR interaction controller.

* * * * *